United States Patent [19]

Oshima et al.

[11] Patent Number: 5,061,771
[45] Date of Patent: Oct. 29, 1991

[54] RING-OPENED POLYMER FROM NORBORNENE TYPE OF POLYCYCLIC MONOMER AND PROCESS FOR PRODUCING THE POLYMER

[75] Inventors: Masayoshi Oshima, Niiza; Teiji Kohara, Kawasaki; Tohru Hosaka, Yokohama; Tadao Natsuume, Yokosuka, all of Japan

[73] Assignee: Nippon Zeon Co., Ltd., Tokyo, Japan

[21] Appl. No.: 433,106

[22] Filed: Nov. 8, 1989

[30] Foreign Application Priority Data

Nov. 14, 1988 [JP] Japan .................. 63-285879

[51] Int. Cl.$^5$ ............ C08F 32/06; C08F 32/08; C08F 2/38
[52] U.S. Cl. .................. 526/282; 526/141; 526/188; 526/281
[58] Field of Search ........... 526/141, 282, 188, 281

[56] References Cited

U.S. PATENT DOCUMENTS 4,614,778  9/1986  Kajiura et al. ............. 526/281 X

FOREIGN PATENT DOCUMENTS 251033    1/1988  European Pat. Off. .
2502748   7/1976  Fed. Rep. of Germany ...... 526/141
60-26024  2/1985  Japan .
60-168708 9/1985  Japan .
61-292601 12/1986 Japan .
63-97611  4/1988  Japan .

OTHER PUBLICATIONS

Ivin, K. et al., "Ring-Opening Polymerization and Addition Polymerization of 5-Methylenebicyclo[2.2.1-]hept-2-ene", *Macromol. Chem., Rapid Commun.* 1, 473-476 (1980).

*Primary Examiner*—Fred Teskin
*Attorney, Agent, or Firm*—Armstrong, Nikaido, Marmelstein, Kubovcik & Murray

[57] ABSTRACT

(1) A solvent-soluble ring-opened polymer constituted of 100-50% by weight of a norbornene derivative of monomer (A) represented by the formula

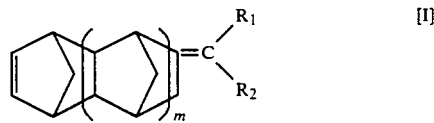

wherein, $R_1$ and $R_2$ are the same or different and each denote hydrogen or alkyl and m denotes an interger of 0 to 2, and 0-50% by weight of another norbornene derivative of monomer (B) capable of undergoing ring-opening copolymerization with the preceding monomer (A), the polymer having a number average molecular weight of 10,000 to 50,000, a weight average molecular weight-to-number average molecular weight ratio (Mw/Mn) of up to 3, and a glass transition temperature of at least 80° C., and (2) a process for producing such ring-opened polymers as stated above.

11 Claims, 1 Drawing Sheet

RING-OPENED POLYMER FROM NORBORNENE TYPE OF POLYCYCLIC MONOMER AND PROCESS FOR PRODUCING THE POLYMER

BACKGROUND OF THE INVENTION

1. Field of the Invention

The present invention relates to a process for producing ring-opened polymers from monomers of a norbornene type which are defined later (hereinafter these monomers are referred to as norbornene-type monomers or norbornene derivatives). More particularly, the invention relates to ring-opened norbornene derivative polymers which have narrow molecular weight distributions, contain no gel, and are best suited as materials for optical purposes and (ii) a process for producing said polymers.

2. Description of the Prior Art.

Polymethyl methacrylate and polycarbonate have been used up to now as macromolecular materials for optical purposes. However, polymethyl methacrylate has a strong tendency to absorb water or moisture and polycarbonate involves the problem that birefringence tends to occur in molded articles of this polymer because it has basically benzene rings and generally high melt viscosity. Hence it is becoming difficult for these polymers to meet performance requirements that are becoming increasingly sophisticated.

In recent years, polymers from norbornene-type polycyclic monomers have been developed as macromolecular materials substantially free of the above noted drawbacks.

For example, Japanese Patent Application Kokai No. Sho. 60-26024 describes that a product of hydrogenating a polymer obtained by the ring-opening polymerization of a tetracyclododecene compound alone or a monomer mixture of the compound and a norbornene compound is superior in transparency, water resistance, and heat resistance and Japanese Patent Application Kokai Nos. Sho. 60-168708 and Sho. 61-292601 disclose that addition copolymers of α-olefins with a tetracyclododecene compound or with a norbornene-type monomer having five or more rings are superior in transparency, heat resistance, chemical resistance, and water resistance. As set forth in these patent applications, polymers from norbornene-type polycyclic monomers have better properties as macromolecular compounds for optical applications.

Meanwhile, alkylidene-containing norbornene-type monomers represented by the following formula [I] are readily obtainable by Diels-Alder reaction of cyclopentadiene with allene or a linear conjugated diene, followed by displacement of a double bond.

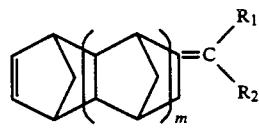
[I]

In this formula, $R_1$ and $R_2$ are the same or different and each denote hydrogen or alkyl and m denotes an integer of 0 to 2.

In particular, ethylidene-containing monomers of formula [I] are far more readily available than the other norbornene-type monomers since ethylidene-norbornene is manufactured in large quantities as a comonomer for its ethylene-propylene terpolymer.

Considering the structure of polymers produced by the ring-opening polymerization of norbornene-type monomers represented by the above formula [I], it is expected that these polymers will be superior in optical properties including transparency and the hydrogenation of these polymers provide polymers more fitted for optical applications. However, no process comprising the ring-opening polymerization of this type of monomer has been known up to now that can yield a polymer which is neither cross-linked nor in gel form and has properties of utility for optical purposes.

It is already known that polymers are producible from norbornene-type monomers of formula [I] by ring-opening bulk polymerization in molds in the presence of a methathesis catalyst. For example, Japanese Patent Application Kokai No. Sho. 63-97611 describes the reaction injection molding (RIM) method to polymerize 5-thylidene-2-norbornene in a mold in the presence of a methathesis catalyst and Japanese Patent Application Kokai No. Sho. 63-37108 (corresponding to EP 251,033) describes the RIM method of polymerizing 6-alkylidene-2-tetracylododecene.

However, all of these polymers obtained by the RIM method are cross-linked and unsuited for optical purposes. The above J. P. Appln. Kokai No. Sho. 63-37108 suggests that a linear polymer of 6-alkylidene-2-tetracyclododecene will be producible by the methathesis polymerization under mild conditions such as those of solution polymerization, but this patent application points out that such a linear polymer, if obtained, will have poor moldability and processability and hence will be unsuitable for practical use.

While Example 11 in this patent application illustrates an experiment of solution-polymerizing ethylidene-tetracylododecene in the presence of a diethylaluminum chloride/tungsten hexahalide catalyst system, the product was reportedly a substance in gel form (that is, the reaction product mixture was not homogeneous), in spite of a 10% or less dilute monomer solution used in the polymerization. In this patent application, an IR spectrum of the product this obtained is shown and it is set forth on the basis of the spectrum that the product is a ring-opened polymer. In this spectrum, however, an absorption between 950 and 1000 cm$^{-1}$, which indicates the presence of double bonds in the main chain (see Makromol. Chem., 78, 231 (1964)), is weak and on the other hand a strong absorption of ambiguous assignment is observed in the vicinity of 1700 cm$^{-1}$. Such a spectrum cannot clarify whether the product is a ring-opened polymer.

The present inventors polymerized the above monomer by using a conventional ring-opening polymerization catalyst system combining an organoaluminum compound with each of transition metal compounds (a tungsten compound and a molybdenum compound), with the result that none of the polymers could be obtained but those, in gel form or having broad molecular weight distributions, which were unfitted for optical applications.

Solution polymerization of 5-methylidenenorbornene, which is one of the monomers represented by the above formula [I], is also known, but no ring-opened polymer can be obtained in this case unless a special methathesis catalyst is used. For example, it is reported that no solvent-soluble polymer is formed with a triethylaluminum/titanium tetrachloride catalyst system (Makromol. Chem., Rapid Commun, 1, 467-472 (1980)).

SUMMARY OF THE INVENTION

An object of the present invention is to provide a ring-opened, norbornene-type compound polymer suitable for optical purposes which has a narrow molecular weight distribution and is free of a gel and good in processability. Another object of the invention is to provide a process for producing such polymers.

As a result of intensive studies made to achieve the above objects, the present inventors have found that the ring-opening polymerization of a norbornene-type monomer of the above formula [I] alone or a monomer mixture composed mainly of said monomer in the presence of a specific ring-opening polymerization catalyst can yield a ring-opened polymer having a narrow molecular weight distribution without causing the incidental addition reaction of alkylidene groups and hence without causing the gelation, that the obtained polymer itself is useful as a material for optical purposes, and that the hydrogenation of this polymer provides a product with improved thermal-degradation resistance, light-degradation resistance, and optical properties. Based on this finding, the present invention has been accomplished.

According thus to the present invention, there are provided.

(1) a process for producing ring-opened, norbornene derivative polymers, which comprises polymerizing 100-50% by weight of a norbornene-type (hereinafter sometimes referred to as a norbornene derivative monomer) of monomer represented by the formula

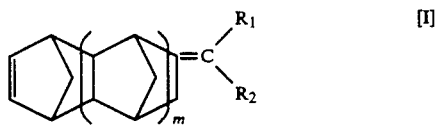

wherein, $R_1$ and $R_2$ are the same or different and each denote hydrogen or alkyl and m denote an integer of 0 to 2, and 0-50% by weight of another norbornene type of monomer capable of undergoing ring-opening copolymerization with the preceding monomer, in the presence of a Ziegler type of ring-opening polymerization catalyst composed of (a) an organometallic compound in which the metallic element belongs to groups I to III of the periodic table, (b) titanium tetrahalide, and (c) activator of the amine family, and (2) a ring opened polymer which is constituted of 100-50% by weight of a norbornene-type monomer represented by the above formula [I] and 0-50% by weight of another norbornene type of monomer capable of undergoing ring-opening copolymerization with the preceding monomer and has a number average molecular weight Mn of 10,000 to 50,000 and a weight average molecular weight-to-number average molecular weight ratio (Mw/Mn) of up to 3.

DETAILED DESCRIPTION OF PREFERRED EMBODIMENTS

Figure 1:
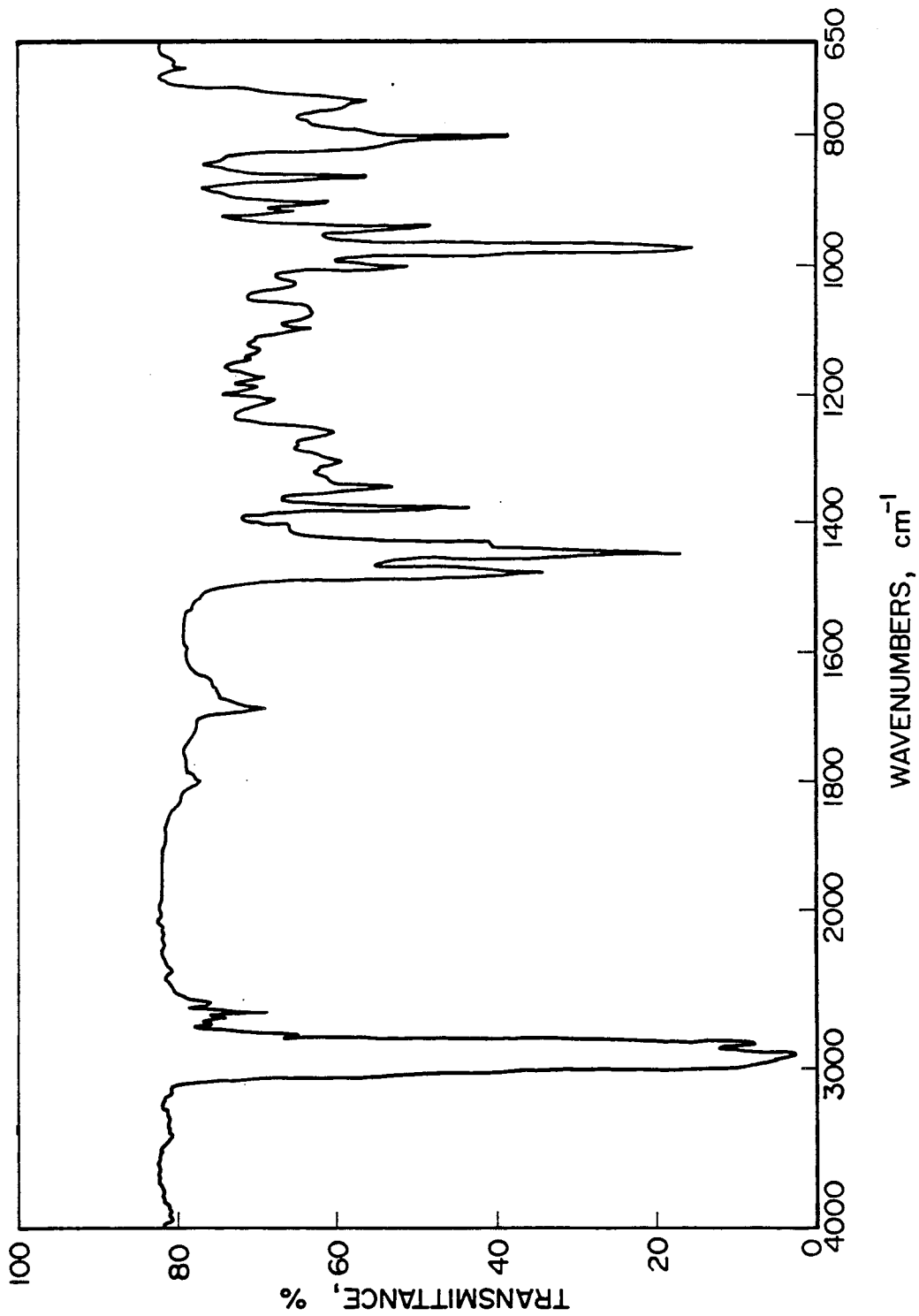
FIG. 1 is the IR spectrum of a polymer according to the present invention.

The monomer used as an essential ingredient in the present invention is an alkylidene-containing, norbornene-type monomer (A) represented by the above formula [I].

Examples of $R_1$ and $R_2$ in formula [I] are hydrogen and alkyl groups including methyl, ethyl, propyl, and butyl.

Examples of the norbornene-type monomer (A) include 5-ethylidene-2-norbornene, 5-propylidene-2-norbornene, 5-butylidene-2-norbornene, 6-ethylidene-2-tetracyclododecene, and 7-ethylidene-2-hexacycloheptadecene.

These norbornene-type monomers (A) may be used alone or in combination. Of these monomers (A), tetracyclic compounds are preferable in view of the glass transition temperatures (Tg) and processability of the resulting polymers and compounds having ethylidene substituents are preferable in their availability.

In the present invention, the norbornene-type monomer (A) may be used jointly, if desirable, with other norbornene types of monomers (B) capable of undergoing ring-opening copolymerization with monomer (A).

Those monomers (B) include, for example, norbornene, dicyclopentadiene, dihydrodicyclopentadiene, tetracyclododecene, cyclopentadiene trimer, and their alkyl substitution products.

As to the proportions of both monomers (A) and (B) to be used, the proportion of monomer (A) is desirably at least 50%, preferably at least 70%, by weight from an economic point of view.

In the present invention, the molecular weight and some other properties of the ring-opened polymer can be controlled by adding an optional monomer such as a linear monoolefin, linear nonconjugated diolefin, or cycloolefin, preferably a linear olefin, to the polymerization system.

Examples of this monomer include butene-1 pentene-1, hexene-1, octene-1, butene-2, pentene-2, 1,4-hexadiene, and cyclopentene.

These monomers are used generally in an amount of up to 10% by weight based on the total amount of norbornene-type monomers (A) and (B).

The ring-opening polymerization catalyst used in the present invention is of a Ziegler type composed of (a) an organometallic compound in which the metallic element belongs to groups I to III of the periodic table, (b) titanium tetrahalide, and (c) activator of the amine family.

Examples of these components (a) through (c) are as follows:

(a) Organometallic compound

Examples of this organometallic compound include organoaluminum compounds, organolithium compounds, and organomagnesium compounds. Of these compounds, preferred are organoaluminum compounds.

These organoaluminum compounds include trimethylaluminum, triethylaluminum, tri-n-propylaluminum, triisopropylaluminum, triisobutylaluminum, trihexylaluminum, trioctylaluminum, triphenylaluminum, tribenzylaluminum, diethylaluminum monochloride, di-n-propylaluminum monochloride, diisobutylaluminum monochloride, di-n-butylaluminum monochloride, diethylaluminum monobromide, diethylaluminum monoiodide, diethylaluminum monohydride, di-n-propylaluminum monohydride, diisobutylaluminum monohydride, methylaluminum sesquichloride, ethylaluminum sesquichloride, isobutylaluminum sesquichloride, ethylaluminum dichloride, ethylaluminum dibromide, propylaluminum dichloride, isobutylaluminum dichloride, ethylaluminum dibromide, and ethylaluminum diiodide.

The above organolithium compounds include n-(butyllithium and n-hexyllithium.

The above organomagnesium compounds include methylmagnesium iodide, ethylmagnesium bromide, methylmagnesium bromide, n-propylmagnesium chloride, t-butylmagnesium chloride, and allylmagnesium chloride.

(b) Titanium tetrahalide

Examples of the titanium tetrahalide include titanium tetrachloride and titanium tetrabromide.

(c) Activator of amine family

Suitable activators of the amine family are aliphatic, alicyclic, and aromatic tertiary amines and heterocyclic amines. Examples of these activators include trimethylamine, triethylamine, tripropylamine, dimethylaniline, tri-n-butylamine, pyridine, and α-picoline.

These compounds (a), (b), and (c) are used generally in such proportions that the (b)/(a) molar ratio may be in the range of 1/1 to 1/500 and the (c)/(a) molar ratio may be in the range of 1/2 to 10.

As described in Japanese Patent Application No. Sho. 57-17883, the catalyst system used in the present invention is already known as a catalyst for ring-opening polymerization of dicyclopentadiene. In the present invention, however, this catalyst system is used for a different purpose, that is, for the ring-opening polymerization of alkylidene-containing, norbornene-type monomer (A), thereby yielding gel-free ring-opened polymers having narrow molecular weight distributions. With another type of ring-opening polymerization catalyst such as the tungsten- or molybdenum-type catalyst or the titaninum-type catalyst containing no amine activator, the gelation cannot be prevented or the obtained polymers have broad molecular weight distributions and are unfitted for optical purposes.

The ring-opening polymerization, in the present invention, is generally carried out in an inert organic solvent, though possible without any solvent.

Such inert solvents include; aromatic hydrocarbons, e.g. benzene, toluene, and xylene; aliphatic hydrocarbons, e.g. n-petane, hexane, and heptane; alicyclic hydrocarbons, e.g. methylene dichloride, dichloroethane, dichloroethylene, tetrachloroethane, chlorobenzene, dichlorobenzene, and trichlorobenzene. These solvents may be used alone or in combination.

There is no particular restriction on the temperature condition of the ring-opening polymerization, though generally the polymerization is conducted at an optional temperature in the range of $-20°$ to $+100°$ C.

The polymerization pressure, in general, is desirably chosen from the range of 0 to 50 Kg/cm$^2$.

The ring-opened polymer produced according to the present invention has a number average molecular weight Mn of up to 50,000, preferably from 10,000 to 45,000, particularly preferably from 15,000 to 35,000, in terms of the value of standard polystyrene and additionally has such a narrow molecular weight distribution that the weight average molecular weight-to-number average molecular weight ratio (Mw/Mn) of up to 3, preferably up to 2.5, particularly preferably up to 2.3.

When an Mn and ratio (Mw/Mn) are in the above respective ranges, the polymer after hydrogenation has good processability and can provide moldings having minimized specific indexes of birefringence.

In addition, the ring-opened polymer of the present invention is not in gel form and is amorphous and soluble in organic solvents such as benzene, toluene, cyclohexane, carbon tetrachloride, and carbon disulfide at room temperature. Therefore the hydrogenation of the polymer can be carried out in a homogeneous phase.

The glass transition temperature (Tg) of the present ring-opened polymer varies with the kinds and proportions of monomers constituting the polymer. The Tg, which is generally at least 80° C., becomes 150° C. or higher when one or more tetracyclic compounds of the norbornene type are used as all the monomers. The Tg, which is desirably at least 100° C., preferably from 120° to 200° C., particularly desirably from 150° to 200° C., can be controlled in a proper range by using a norbornene-type monomer (A) jointly with one or more other norbornene-type monomers (A) or (B).

Preferred examples of the ring-opened polymer are homopolymers of alkylidenetetracyclododecenes, copolymers of two or more alkylidenetetracyclododecenes having different structures and copolymers of alkylidenetetracyclododecene with alkyltetracyclododecene, dicyclopentadiene (DCPD) or norbornene.

While the present inventive ring-opened polymer itself has superior optical properties, it is desirable for optical applications to hydrogenate the polymer, thereby improving it further in thermal-degradation resistance and light resistance. From this point of view the present ring-opened polymer is useful as an intermediate for raw materials of molded optical articles or parts.

That is, the double bonds of the present ring-opened polymer can be saturated partly or entirely by hydrogenation to enhance the thermal-degradation resistance and light resistance of the polymer.

The degree of hydrogenation regarded as 100% when all the double bonds are saturated by the hydrogenation, ranges theoretically from 0 to 100% and actually can be freely chosen from this range. However, the degree of hydrogenation is desired to be at least 50% for the purpose of enhancing the thermal-degradation resistance and light resistance.

The hydrogenation of the ring-opened polymer can be carried out by the ordinary method. The hydrogenation catalyst may be not particularly restricted but may be any of the catalysts which are used generally for olefin hydrogenation. Such usable catalysts are as follows:

The suitable heterogeneous catalysts include solid catalysts such as nickel, palladium, platinum, and these metals supported by carriers such as carbon, silica, diatomaceous earth, alumina, and titanium oxide. That is the suitable heterogeneous catalysts are exemplified by nickel/silica, nickel/diatomaceous earth, palladium/carbon, palladium/silica, palladium/diatomaceous earth, and palladium/alumina.

The suitable homogeneous catalysts include solutions of; compounds of periodic table group VIII metals such as nickel and cobalt combined with organometallic compounds of periodic table groups I-III metals; e.g nickel naphthenate/triethylaluminum, cobalt octenate/n-butyllithium, and nickel acetylacetonate/triethyl aluminum; and solutions of rhodium compounds.

The hydrogenation is conducted in a phase homogeneous or heterogeneous depending on the type of cata lyst used under a hydrogen pressure of 1 to 150 atm. at a temperature of 0° to 250° C., preferably 20° to 200° C.

The degree of hydrogenation, optionally controllable by varying the hydrogen pressure, reaction temperature; reaction period, or catalyst concentration, is at least 50% as stated above, preferably 80% or more, particularly preferably 90% or more, for the purpose of providing a hydrogenated polymer which exhibits superior thermal-degradation resistance and light resistance.

The present inventive ring-opened polymer and its hydrogenation product can be molded or processed by widely known methods. When molded or processed, they may contain various additives, e.g. inorganic and organic fillers, stabilizers, antistatic agents, and lubricants.

The present inventive ring-opened polymer and its hydrogenation product, in the form of various molded articles, are useful over a wide variety of application fields, since the former polymer has a high glass transition temperature and the hydrogenation product is a polymer superior in thermal-degradation resistance and light resistance, as is apparent from the original unsaturated groups being substantially hydrogenated, and also superior in water resistance and optical properties including transparency and anti-birefringent characteristics (capable of providing moldings which have minimized specific indexes of birefringence).

Possible applications of these polymers include; optical articles, e.g. lenses, optical disks, optical fibers, pellicles, and glass window applications; electrical components, e.g. water tanks for electric irons, parts for microwave ovens, substrates of liquid crystal display devices, printed circuit boards, high-frequency circuit boards, and transparent electro-conductive films and sheets; and medical or chemical tools, e.g. syringes, pipettes, and animal gauges; and other various articles, e.g. camera bodies, housings of various instruments, films, sheets, and helmets.

The following examples illustrate the present invention in more detail without restricting the scope of the invention.

EXAMPLE 1

(1) Preparation of ring-opened polymer

A 500-ml separable flash thoroughly dried and flushed with nitrogen gas was charged with 13.5 g of 6-ethylidene-2-tetracylododecene (hereinafter abbrebiated as ETD), 1.0 m mole of hexene-1, and 60 ml of toluene.

Further, 1.5 m moles of triethylaluminum, 0.30 m mole of titanium tetrachloride, and 1.5 m moles of triethylamine were added in succession to initiate the polymerization, which was continued with stirring at 25° C. for 4 hours.

Thereafter the objective polymer was precipitated by adding an acetone/isopropanol(1:1) mixture. The precipitate was filtered off, and further dissolved in toluene. Then an acetone/isopropanol(1:1) mixture was added again to precipitate the polymer, which in turn was filtered off and dried, thus giving the intended product. No substance in gel form was found in the reaction product.

The result of proton NMR analysis of the obtained polymer was that an absorption due to the protons of olefin double bonds were observed between $\delta = 5.0$ and 5.4 ppm and the intensity of this absorption was in near agreement with the theoretical value (16.7%), therefrom the obtained polymer being confirmed to have a ring-opened structure.

In an IR spectrum, shown in FIG. 1, of this polymer, a strong absorption due to the trans double bonds present in the main chain was observed at about 975 $cm^{-1}$, therefrom the polymer being also confirmed to have a ring-opened structure. This spectrum was different distinctly from one shown in Japanese Patent Application Kokai No. Sho. 63-37108 cited before.

The obtained polymer was soluble in benzene, toluene, cyclohexane, carbon tetrachloride, and carbon disulfide at room temperature.

(2) Preparation of hydrogenation product

A solution of 3 g of the above polymer in 30 ml of cyclohexane and 0.3 g of a palladium carbon were put in a 100-ml stainless steel ampule and mixed together. The air in the ampule was replaced by hydrogen and the hydrogen pressure was raised to 50 $Kg/cm^2G$. The mixture was maintained at 10° C. for 30 minutes while stirring. It was then heated to 120° C. and stirred at this temperature for 18 hours. The resulting solution was filtered through a filter of 1-μm pore size, and the filtrate was poured into methanol to precipitate the intended product, which was then dried and purified.

$^1$H-NMR analysis confirmed that the ring-opened polymer was completely hydrogenated since the absorption, between $\delta = 5.0$ and 5.4 ppm, that is, the absorption due to the double bond protons, had disappeared.

Physical properties of the ring-opened polymer and its hydrogenation product thus obtained were measured in the following manner. Results of the measurements are summarized in Table 1.

Methods for measuring physical properties (i) Molecular weight and molecular weight distribution (in terms of the values of standard polystyrene):

Measured in cyclohexane by using HLC Model 802A, supplied by Tosoh Corp.

(ii) Melt viscosity (at 300° C.)

The mass rate of polymer flow was measured by using a flow tester (Model CFT-500, supplied by Shimazu Corp.) under the conditions: die inner diameter 1 mm, die length 10 mm, load 50 Kgf, and temperature 300° C. The melt viscosity was calculated from the found flow rate.

(iii) Light transmittance

Measured at a wavelength of 830 nm by using a total light transmittance measuring instrument supplied by Shimazu Corp.

(iv) Glass transition temperature (Tg)

Measured at a heating rate of 10° C./min by using a differential scanning calorimeter (Model 20, supplied by Seiko Instruments Inc.)

(v) Specific index of birefringence

Measured with a light (663 nm) beam being single-passed by using a full-automatic birefringence measuring instrument supplied by Nippon Denshi-Kogaku Co., Ltd.

(vi) Moisture resistance

Water absorption (wt%) was measured in accordance with JIS K-6911 (testing method for moisture resistance).

(vii) Molding method

A sample of the hydrogenation product was injection molded by using an injection molding machine (Model M-70A-DM, supplied by Meiki Co., Ltd.) at a resin temperature of 330° C. and a mold temperature of 90° C., forming disks of 130 mm diameter and 1.2 mm thickness. These disks were used to measure the light transmittance, birefringence, and water absorption.

EXAMPLE 2 AND 3

Ring-opened EDT polymers were prepared according to the procedure of Example 1 but the amount of hexene-1 used was changed to 0.4 m mole (Example 2) and 0.1 m mole (Example 3).

Both the obtained polymers were soluble in the above-mentioned organic solvents. These polymers were hydrogenated according to the procedure of Example 1.

Physical properties of the ring-opened polymers and their hydrogenation products were measured in the same manner as in Example 1. Results of the measurements are summarized in Table 1.

TABLE 1

|  | Example 1 | Example 2 | Example 3 |
|---|---|---|---|
| Ring-opened polymer |  |  |  |
| Number average molecular weight Mn | 21,000 | 30,000 | 45,000 |
| Molecular weight distribution, Mw/Mn | 2.0 | 2.3 | 2.5 |
| Glass transition temperature (°C.) | 180 | 180 | 185 |
| Hydrogenated polymer |  |  |  |
| Glass transition temperature (°C.) | 160 | 160 | 160 |
| Melt viscosity (centipoise) | 10,000 | 40,000 | 80,000 |
| Light transmittance (830 nm) (%) | 90 | 91 | 90 |
| Specific index of birefringence (633 nm) | 5 | 10 | 40 |
| Water absorption (%) | 0.01 | 0.01 | 0.01 |

EXAMPLE 4

A ring-opened polymer was prepared according to the procedure of Example 1 but by using a monomer mixture of 75 wt% of EDT and 25 wt% of ethylidenenorbornene.

This ring-opened polymer was also soluble in the above-mentioned organic solvents and found to have a number average molecular weight Mn of 21,000, Mw/Mn ratio of 2.2, and glass transition temperature Tg of 130° C.

The product of hydrogenating (100%) this polymer according to the procedure of Example 1 gave molded pieces which showed a specific index of birefringence of 5.

EXAMPLE 5

A ring-opened polymer was prepared according to the procedure of Example 1 but by using a monomer mixture of 70 wt% of EDT and 30 wt% of methyltetracyclododecene.

This ring-opened polymer was also soluble in the above-mentioned organic solvents and found to have a number average molecular weight Mn of 20,000, Mw/Mn ratio of 2.1, and glass transition temperature of 183° C.

The product of hydrogenating (100%) this polymer according to the procedure of Example 1 gave molded pieces which showed a specific index of birefringence of 5.

According to the present invention, it is possible to produce efficiently ring-opened, norbornene-type polymers which have narrow molecular weight distributions, contain no gel, and are good in processability. While there ring-opened polymers themselves are useful as materials for optical purposes, products of hydrogenating these polymers, in particular, can be favorably used as materials for optical purposes over a wide variety of industrial application fields.

What is claimed is:

1. A solvent-soluble ring-opened polymer constituted of 100–50% by weight of norbornene monomer (A) represented by the formula

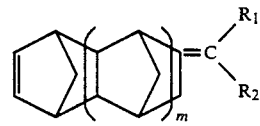

wherein, $R_1$ and $R_2$ are the same or different and each denotes hydrogen or alkyl and m denotes an integer of 0 to 2, and 0–50% by weight of norbornene monomer (B) capable of undergoing ring-opening copolymerization with monomer (A), said polymer having a number average molecular weight MN of 10,000 to 50,000, a weight average molecular weight-to-number average molecular weight ratio (Mw/Mn) of up to 3, and a glass transition temperature of 80–200° C.

2. The ring-opened polymer of claim 1, which has a number average molecular weight Mn of 10,000 to 45,000, a weight average molecular weight-to-number average molecular weight ratio (Mw/Mn) of up to 2.5, and a glass transition temperature of 100° to 200° C.

3. The ring-opened polymer of claim 2, which has a number average molecular weight Mn of 15,000 to 35,000, a weight average molecular ratio (Mw/Mn) of up to 2.3, and a glass transition temperature of 120° to 200° C.

4. The ring-opened polymer of claim 1, which contains substantially no norbornene monomer (B).

5. The ring-opened polymer of claim 4, wherein the norbornene monomer (A) is an alkylidenetetracyclododecene.

6. The ring-opened polymer of claim 2, which is a copolymer consisting of norbornene monomer (A) and norbornene monomer (B).

7. The ring-opened polymer of claim 6, wherein the norbornene monomer (B) is selected from the group consisting of norbornene, dicyclopentadiene, tetracyclododecene, cyclopentadiene trimer, and their alkyl substitution products.

8. The ring-opened polymer of claim 2, which is an ethylidenetetracyclododecene homopolymer or a copolymer containing at least 50% of polymerized ethylidenetetracyclododecene units.

9. A process for producing a ring-opened, norbornene polymer which comprises polymerizing 100–50% by weight of a norbornene monomer (A) represented by the formula

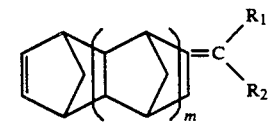

wherein $R_1$ and $R_2$ are the same or different and each denotes hydrogen or alkyl and m denotes an integer of 0 to 2, and 0–50% by weight of norbornene monomer (B) capable of undergoing ring-opening copolymerization with monomer (A), in the presence of a linear olefin and a ring-opening polymerization catalyst composed of (a) an organometallic compound wherein the metal is in groups I to III of the periodic table, (b) a titanium tetrahalide, and (c) an amine activator.

10. The process of claim 9, wherein the ring-opened polymer contains at least 70% by weight of norbornene monomer (A).

11. The process of claim 9, wherein the organometallic compound is an organoaluminum compound.

* * * * *